United States Patent [19]

Kure-Jensen et al.

[11] Patent Number: 5,301,499
[45] Date of Patent: Apr. 12, 1994

[54] OVERSPEED ANTICIPATION AND CONTROL SYSTEM FOR SINGLE SHAFT COMBINED CYCLE GAS AND STEAM TURBINE UNIT

[75] Inventors: Jens Kure-Jensen; William I. Rowen; James H. Moore, all of Schenectady, N.Y.

[73] Assignee: General Electric Company, Schenectady, N.Y.

[21] Appl. No.: 544,983

[22] Filed: Jun. 28, 1990

[51] Int. Cl.⁵ .............................................. F02C 6/18
[52] U.S. Cl. .................... 60/39.03; 60/39.182
[58] Field of Search ............. 60/39.02, 39.03, 39.182, 60/39.3

[56] References Cited

U.S. PATENT DOCUMENTS

| | | | |
|---|---|---|---|
| 2,936,028 | 5/1960 | Gatzemeyer et al. | 158/36.4 |
| 3,097,488 | 7/1963 | Eggenberger | 60/73 |
| 3,098,190 | 7/1963 | Spencer, Jr. et al. | 322/29 |
| 3,150,487 | 9/1964 | Mangen et al. | 60/39.18 |
| 3,198,954 | 8/1965 | Eggenberger et al. | 290/40 |
| 3,340,883 | 9/1967 | Peternel | 137/26 |
| 3,418,806 | 12/1968 | Wagner et al. | 60/39.51 |
| 3,505,811 | 4/1970 | Underwood | 60/39.03 |
| 3,520,133 | 7/1970 | Loft et al. | 60/39.14 |
| 3,561,216 | 2/1971 | Moore, Jr. | 60/73 |
| 3,601,617 | 8/1971 | De Mello et al. | 290/40 C |
| 3,738,104 | 6/1973 | Rosa | 60/39.28 R |
| 3,826,094 | 7/1974 | Conrad et al. | 60/686 |
| 3,848,138 | 11/1974 | Park | 290/40 |
| 3,879,616 | 4/1975 | Baker et al. | 60/39.182 |
| 3,930,367 | 1/1976 | Gasparoli | 60/39.182 |
| 4,091,956 | 4/1978 | Baker et al. | 60/39.182 |
| 4,519,207 | 5/1985 | Okabe et al. | 60/39.182 |
| 4,532,761 | 8/1985 | Takaoka et al. | 60/39.13 |
| 4,550,565 | 11/1985 | Ozono | 60/39.182 |
| 4,793,132 | 12/1988 | Okabe | 60/39.182 |
| 5,042,246 | 8/1991 | Moore et al. | 60/39.182 |

FOREIGN PATENT DOCUMENTS 160502  9/1983  Japan .
1050063A 12/1966 United Kingdom .
2017219A 10/1979 United Kingdom .
2099516A 12/1982 United Kingdom .

OTHER PUBLICATIONS

Rowen et al, *Simplified Mathematical Representations of Heavy-Duty Gas Turbines*. ASME Paper 83-GT-63; Oct., 1983.
Rowen et al, *Operating Characteristics of Heavy-Duty Gas Turbines in Utility Service*. ASME Paper 88-GT-150; Jun., 1988.
Patent Abstracts of Japan, vol. 7, No. 169 (M-231)(1314) Jul. 26, 1983 & JP-A-58 74809, May 6, 1983.
Patent Abstracts of Japan, vol. 10, No. 261 (M-514)(2317) Sep. 5, 1986 & JP-A-61 87902, May 6, 1986.

*Primary Examiner*—Louis J. Casaregola
*Attorney, Agent, or Firm*—Nixon & Vanderhye

[57] ABSTRACT

A system and method for anticipating and controlling overspeed in a combined cycle turbine of the type having a gas turbine with a fuel flow control valve and a steam turbine with at least one steam control valve both disposed on a single shaft and having a heat recovery steam generator heated by said gas turbine and connected to supply steam to the steam control valve, the combined cycle turbine having a unified control system and driving a load. Below a preselected shaft speed the gas turbine fuel command signal controls power. Above the preselected shaft speed the steam turbine speed signal also controls power. Anticipation of overspeed under severe transient load changes, such as loss of electrical load, is provided by a power load unbalance system, wherein gas turbine power and steam turbine power responsive signals are summed after proportionately scaled power responsive signals exceed load by a preselected amount, whereby appropriate action is taken to reduce power before significant overspeed can occur.

10 Claims, 4 Drawing Sheets

OVERSPEED ANTICIPATION AND CONTROL SYSTEM FOR SINGLE SHAFT COMBINED CYCLE GAS AND STEAM TURBINE UNIT

BACKGROUND OF THE INVENTION

This invention relates generally to an improved system and method for anticipating and controlling overspeed in a combined cycle turbine of the type having a gas turbine and steam turbine on a single shaft. More particularly, the invention relates to an improved system and method for limiting overspeed during transient load conditions in a combined cycle turbine driving a generator which is synchronized to an electrical load grid, including guarding against overspeed in event of electrical load loss. Such a combined cycle turbine and a method for starting up and synchronizing it with a unified control system was disclosed pending application in Ser. No. 431,892, filed Nov. 6, 1989 and assigned to the present assignee.

In some large combined cycle power plants the steam turbine and gas turbine are solidly coupled on a single shaft to drive a single electrical generator. The primary source of energy input to the rotating machine is the fuel which is burned in the gas turbine combustors. This shows up almost immediately as power delivered by the gas turbine. The waste heat from the gas turbine generates steam. This steam, which is generated by a heat recovery steam generator (HRSG), is utilized by a steam turbine as a secondary source of power input to the rotating shaft train. While there is some time lag before heat from the gas turbine exhaust gas manifests itself as a power input source in the form of steam available at the turbine control valves, the control of the two sources of energy must be coordinated in order to properly control and protect the rotating machinery.

When synchronized with the electrical grid the speed of the machine is determined by the frequency of the grid. Of the total mechanical power produced from the fuel to drive the generator, approximately two-thirds is produced by the gas turbine and one-third by the steam turbine from the thermal energy recovered from the gas turbine exhaust. In most cases, all of the steam produced by the heat of the gas turbine exhaust is expanded through the steam turbine. In other cases, some of the steam is extracted from the power cycle for process uses. If all of the steam produced by the gas turbine exhaust is expanded through the steam turbine, and the unit is synchronized, the steady state control of electrical output, is achieved entirely by controlling gas turbine fuel flow, with the steam control valve or valves maintained in the fully open position. When not synchronized, on the other hand, either fuel flow to the gas turbine, steam flow to the steam turbine, or both, must be controlled to control speed, and there is not always a direct relationship between the two.

Gas turbines and steam turbines control speed (or load) by increasing and decreasing fuel flow and steam flow, respectively, in response to an error signal generated in the control system. An error signal is the difference between a reference (desired value) of an operating condition and the actual measured value of the operating condition. The gas turbine control system utilizes several such error signals to develop several fuel command signals which are applied to a "minimum value gate". The smallest fuel command signal generated by the startup fuel schedule is selected by the minimum value gate unless temperature or other limitations have a smaller fuel command signal. As speed approaches the governor set point, the speed error requires the smallest fuel command signal and becomes the controlling signal. An integrated gas turbine control system providing for open loop programmed start-up control with a number of closed loop constraints simultaneously controlling the gas turbine in accordance with operating conditions such as temperature, speed and acceleration is described in U.S. Pat. No. 3,520,133 issued Jul. 14, 1970 to Daniel Johnson and Arne Loft. Once the unit is at rated speed and synchronized, load is controlled by adjusting the fuel flow in accordance with the setting of the governor load set point.

A steam turbine is self-starting as soon as steam is admitted through the control valve, but due to need to allow temperatures to equalize in the rotor and shell, startup programs have been developed for starting and loading a steam turbine. Combining acceleration and speed control through the use of a "minimum value gate" are shown in U.S. Pat. No. 3,340,883—Peternel, issued Sep. 12, 1967. Once a steam turbine is synchronized, the load is controlled by adjusting steam flow through the control valve in accordance with the setting of a load set point, as shown in U.S. Pat. No. 3,097,488 issued to M. A. Eggenberger et al on Jul. 16, 1963.

Unified control systems have been proposed for single shaft combined cycle plants with supplemental firing of fuel in the heat recovery steam generator which attempted to force a programmed load split between the gas turbine and the steam turbine, such a system being disclosed in U.S. Pat. No. 3,505,811 to F. A. Underwood issued Apr. 14, 1970. However, improved thermodynamic performance can be achieved by designing the system so that the steam valve remains in the fully open position. In this way, the steam turbine accepts the total generation capacity of the steam generator over the entire load range without responding to small or slow speed variations which would require steam valve adjustment.

As load is increased on the gas turbine, more heat energy will flow with the exhaust gas to the HRSG where it will cause an increase in steam flow to the steam turbine. This will cause the steam pressure to rise so that the steam turbine will absorb this flow without any control action. A reduction in gas turbine load will, in similar manner, result in a reduced steam flow to the steam turbine. Thus, the steam turbine will follow the load changes on the gas turbine with some time delay. Hence, normal control of a combined cycle plant on a single shaft under slowly varying load conditions is by means of increasing or decreasing rate of fuel flow with change in load.

While this provides optimum thermodynamic performance under steady state or slowly varying load changes, disturbances in steady or quasi-steady operation may occur. It would be desirable to provide for proportional control of both fuel flow and steam flow above rated speed. Although, a gradual rise in shaft speed above rated speed will cause the gas turbine speed control to reduce fuel flow and hence power to the shaft in a proportional manner with speed rise, this may not be adequate during transient load change. It would be desirable to have a system in which, as long as the shaft speed was below a preset value, the steam turbine would only respond by a reduced output as the steam flow from the HRSG is reduced, but in which a rise in combined shaft speed above the preset value would cause the steam valves to go closed in a manner proportional to the speed rise. This would reduce the steam flow to minimum flow level and hence shut off the steam flow as a contributor to excessive overspeed.

Under more severe, transient conditions, such as in the event of sudden loss of full electrical load, the above described proportional action of both fuel flow and steam flow may not occur fast enough to limit the speed rise of the unit to a value that will not cause the overspeed trip to activate, typically at 110% rated speed. Modern fossil fired steam turbines use a power-load unbalance system to control overspeed to a value below that of the setting of the overspeed trip. This permits the unit to experience a load rejection, yet remain running under speed control at or near synchronous speed. Thus, the unit can, if desired, continue to carry station auxiliary load and also be in a condition for prompt resynchronizing with the system. Such power load unbalance systems are shown in U.S. Pat. No. 3,198,954 in the name of M. A. Eggenberger et al issued Aug. 3, 1965 or in U.S. Pat. No. 3,601,617 to DeMello et al issued Aug. 24, 1971.

The prior art power-load unbalance systems in steam turbine generators only provide for one power input. The anticipation of overspeed is more complex and difficult in a combined cycle having both steam turbine and gas turbine on a single shaft.

Accordingly, one object of the present invention is to provide an improved method for controlling and preventing overspeed in a single shaft combined cycle turbine during transient load disturbances.

Another object of the invention is to provide an improved power load unbalance control system for anticipating and preventing overspeed in a combined cycle turbine.

Another object of the invention is to provide an improved unified control system for anticipating and preventing overspeed in a single shaft combined cycle plant, including proportional control between steam turbine and gas turbine during transient load conditions.

SUMMARY OF THE INVENTION

Briefly stated, the invention is practiced by an improved method and system for anticipating and controlling overspeed in a combined cycle turbine of the type having a gas turbine with a fuel flow control valve and a steam turbine with at least one steam control valve both disposed on a single shaft and having a heat recovery steam generator heated by said gas turbine and connected to supply steam to the steam turbine control valve, the combined cycle turbine having a unified control system and driving a load. Below a preselected shaft speed only the gas turbine fuel command signal controls power. Above the preselected shaft speed the steam turbine speed signal participates in the control of power. Anticipation of overspeed under severe transient load changes, such as loss of electrical load, is provided by a power load unbalance, wherein gas turbine power and steam turbine power responsive signals are summed after proportionately scaled power-responsive signals exceed load by a preselected amount and appropriate action is taken to reduce power before significant overspeed can occur.

DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a simplified schematic view of a single shaft combined cycle unit,

FIG. 2 is a simplified block diagram of a unified combined cycle turbine control, FIG. 3a is a simplified block diagram of a typical steam turbine speed control, FIG. 3b is a graph which illustrates the variation of output of steam turbine and gas turbine as a function of speed of the rotor, and FIG. 4 is a simplified logic diagram illustrating an improved power-load unbalance system for a combined cycle turbine.

DESCRIPTION OF THE PREFERRED EMBODIMENT

Figure 1:
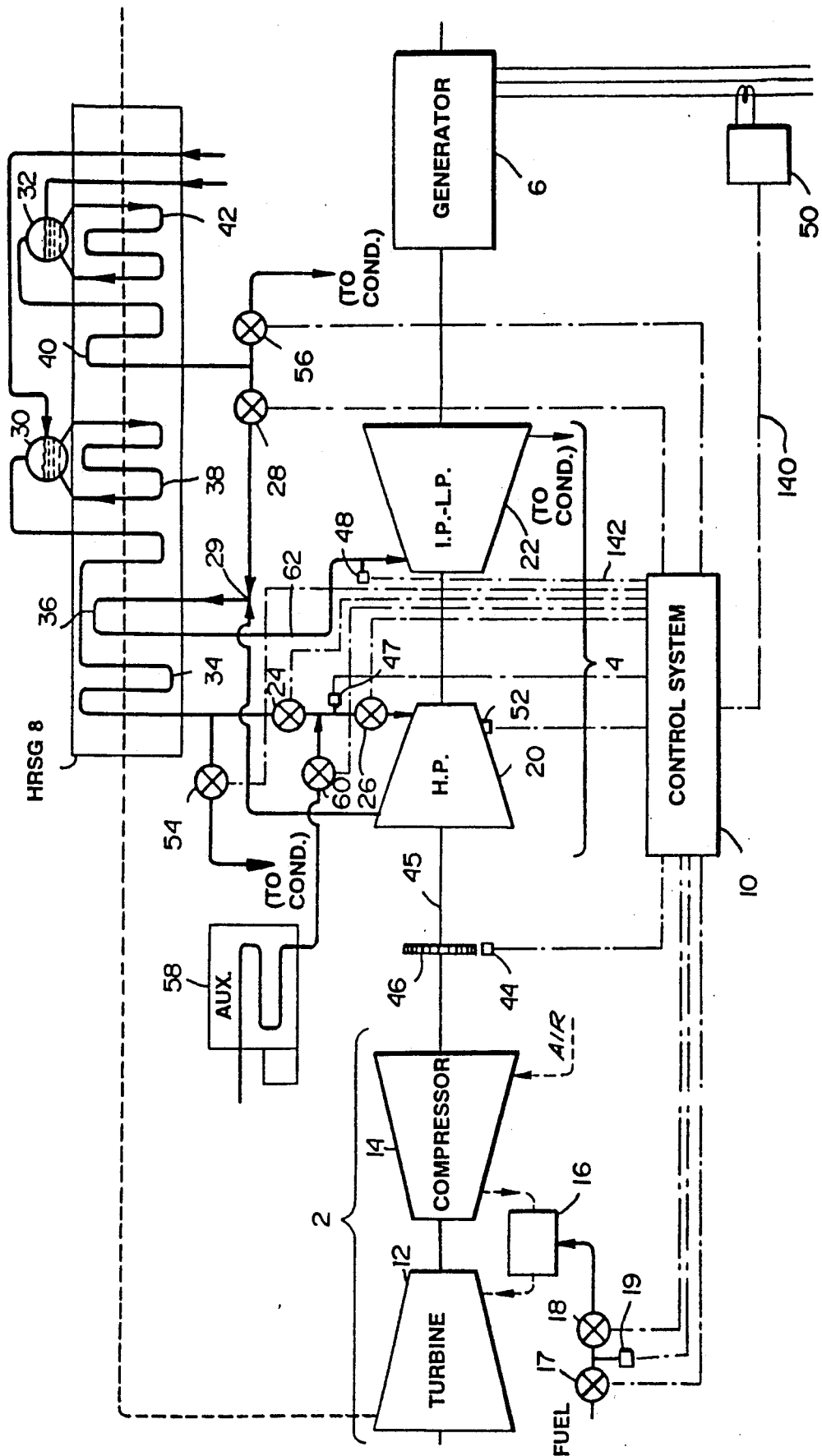

Referring to FIG. 1 of the drawing, a gas turbine 2 is connected in tandem with a steam turbine 4 to a load, such as generator 6. The hot exhaust gas from gas turbine 2 flows through a heat recovery steam generator (HRSG) 8, which supplies steam to steam turbine 4. The entire system is controlled by a unified control system designated 10.

The elements of gas turbine 2 are a turbine 12, an air compressor 14, and a combustion chamber 16 supplied with fuel through a fuel stop valve 17 and a fuel control valve 18. Fuel pressure is measured by a pressure sensor 19 ahead of the fuel control valve 18, and is maintained as a function of speed by modulation of the stop valve 17. Steam turbine 4 comprises a high pressure (H.P.) section 20 and a lower pressure section 22 (combined intermediate pressure and low pressure section (I.P.-L.P.). "Primary" throttle steam from HRSG 8 flows through a stop valve 24, and control valves 26, to the inlet of the high pressure steam turbine section 20. A supplementary flow of "secondary" steam at a lower pressure level from HRSG 8 is admitted through a secondary steam valve 28, and joins (at 29) steam which has been expanded through turbine section 20 and before entering the reheater section 36 of HRSG8. After steam flows through the lower pressure section 22, it enters the condenser (COND.), which is not shown, but which is conventional. The condensate is recirculated by feed water pumps (not shown) back to the HRSG8.

Heat recovery steam generator 8 has associated with it a high pressure steam drum 30, low pressure steam drum 32, and contains banks of steam generating, super heating, reheating and feed water heating tubes which may vary in arrangement from one power plant to another. The disclosed arrangement includes high pressure super heat section 34, reheater section 36, high pressure steam generating tubes 38, low pressure super heat tubes 40, and low pressure steam generating tubes 42.

The control system 10 includes means for sensing operating conditions of the combined cycle plant. These include a speed sensor 44 responsive to speed of a toothed wheel 46 associated with a single rotating shaft 45 connecting gas turbine 2, steam turbine 4 and generator 6. The speed sensor 44 also serves as an acceleration sensitive device, since the speed signal may be differentiated with respect to time. Main steam pressure ahead of control valves 26 is measured by a steam pressure sensor 47. A measurement representing power input supplied by the steam turbine is carried out using another steam pressure sensor 48 measuring reheat steam pressure at the I.P.-L.P. turbine inlet. Measurement responsive to generator load is carried out using a sensor 50 which is responsive to current on the generator output lines. Steam turbine metal temperature is measured by one or more sensors such as 52. Only a representative number of sensors are shown in FIG. 1, a great many more being used in actual practice.

Steam bypass valves 54, 56 and an auxiliary, separately fired steam generator 58 with auxiliary steam inlet valve 60 are shown, it being understood that in actual practice a great many more valves and auxiliary devices would be necessary. Instead of an auxiliary steam generator, another source of auxiliary steam to the inlet valve 60 could be a heat recovery steam generator of another combined cycle turbine.

All of the steam admission valves 24, 26, 28, 60 are provided with actuators to position the valves in response to signals from a unified control system 10. The gas turbine fuel valve 18 determines the rate of fuel flow to the gas turbine in response to a fuel flow command signal.

The rotating members of steam turbine sections 20 and 22 are solidly coupled by a rigid (non-flexible) coupling and, in turn, the steam turbine 4 is solidly coupled to the generator 6 by a rigid coupling. The rotating members of gas turbine 2 are solidly coupled to the rotating members of steam turbine 4 by means of rigid couplings, and the system is provided with a single thrust bearing for all of the tandem-connected shafts referred to hereinafter as a "single shaft". Thus the rotating members are coupled together on the single shaft 45, and the gas and steam turbines operate as a single unit under control of unified control system 10. Steam conduit 62 directly connects the outlet of steam reheater section 36 with the inlet of lower pressure I.P.-L.P. steam turbine section 22. Steam flowing through conduit 62 consists of expanded steam from the outlet of the high pressure turbine section 20, joined at point 29 by supplementary steam flowing through supplementary steam valve 28 from the low pressure superheat tubes 40. In some plants having only a single pressure level HRSG, the supplementary steam would not be generated or added to steam entering the reheater 36. The invention is also useful in combined cycle plants where steam is generated at three different pressures, all being admitted to the steam turbine.

Figure 2:
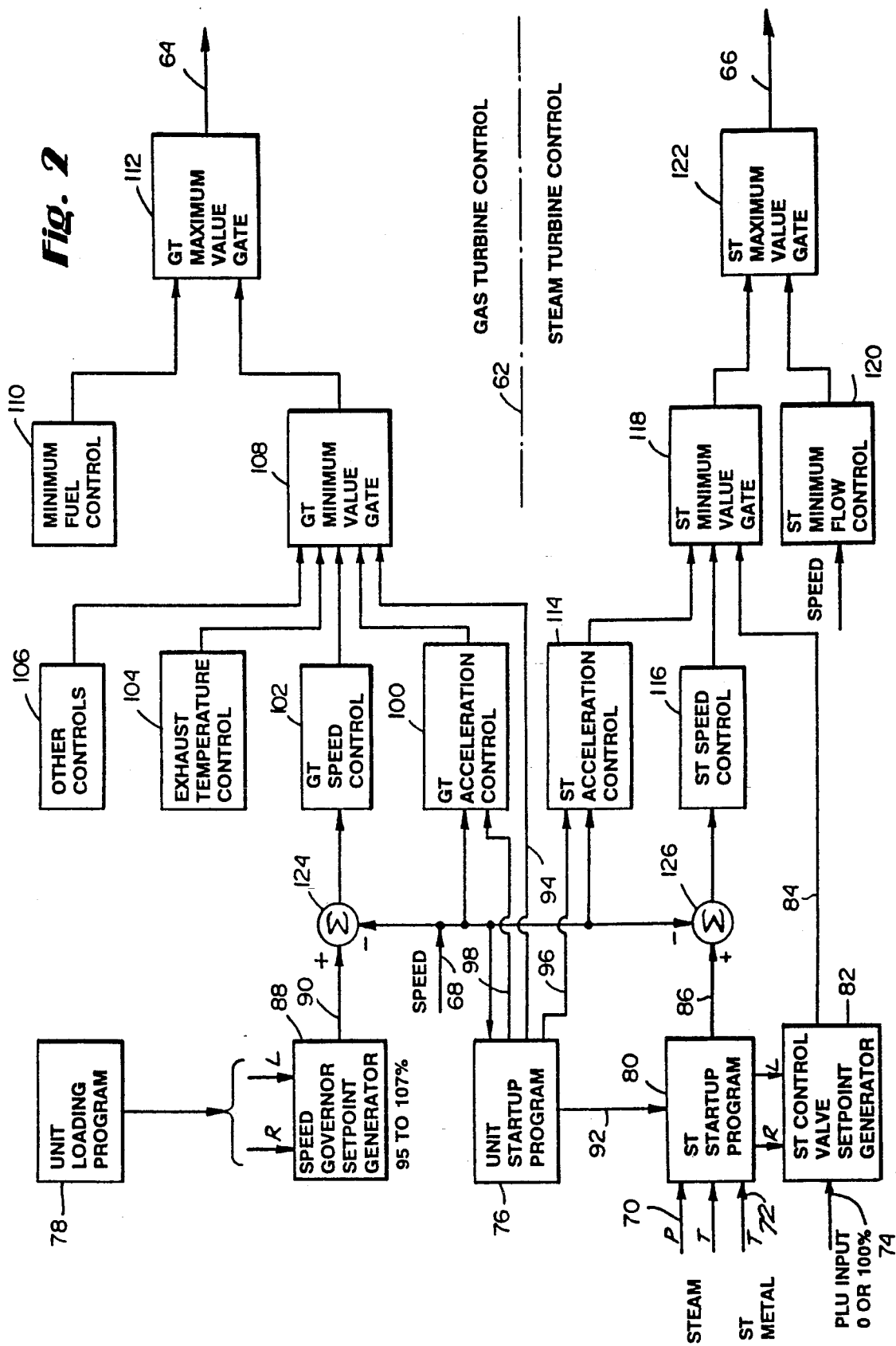

Referring now to FIG. 2 of the drawing, the unified control system 10 of FIG. 1 is illustrated in block diagram form. The upper part of the diagram above dot-dash line 63 comprises the gas turbine portion of the control which results in an output signal 64 in the form of a fuel flow command signal to the gas turbine fuel flow control valve (18 in FIG. 1). The means by which the fuel flow rate to the gas turbine is controlled by this signal is not material to the present invention.

The lower part of FIG. 2 below dot-dash line 63 represents the steam turbine portion of the control, which results in a steam flow command signal 66 to the steam valves representing a desired valve position. There may be a number of steam valves controlled by the signal according to a schedule of opening and closing, the number of such valves being immaterial to the present invention. These are represented by the single control valve 26 leading to the high pressure turbine shown in FIG. 1 and referred to simply as a "control valve".

Figure 4:
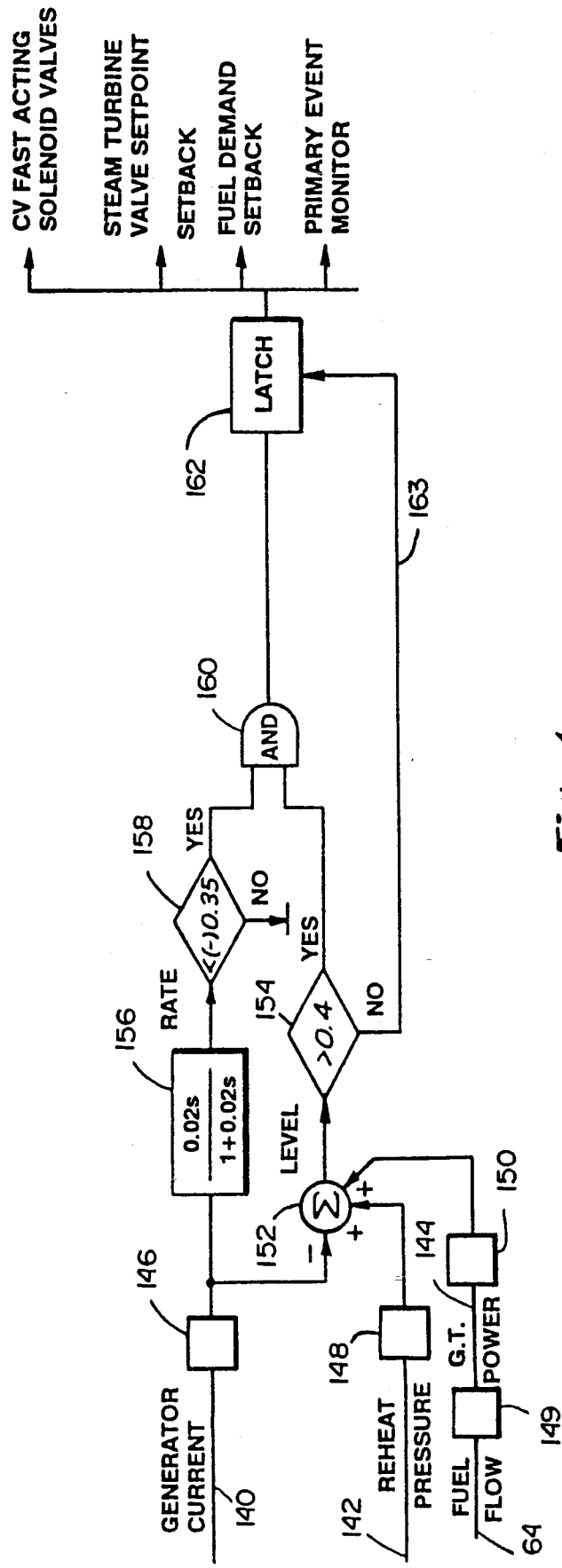

A number of operating parameters of the combined cycle plant are input to the control system, such as a speed signal 68 representing actual shaft speed (sensor 44 in FIG. 1), a main steam pressure signal 70 (sensor 47 in FIG. 1), steam turbine shell metal temperature 72 (sensor 52 in FIG. 1), and a power-load unbalance input signal 74 (from latch 162 in FIG. 4). Additional preselected or variable set points or reference signals are generated by digital computer programs designated as a unit startup program 76, a unit loading program 78, and a steam turbine startup program 80.

One output of the steam turbine startup program 80 is supplied to a steam control valve set point generator 82 serving to provide a control valve set point signal 84 to variable position the controlling steam control valves between 0% (closed) and 100% (open). A second output from the steam turbine startup program 80 is a selectable speed reference signal 86 representing a desired steam turbine speed. The steam turbine speed reference 86 may be used to control shaft speed for various intermediate speeds used in the turbine start-up cycle.

Similarly, one output from the unit loading program 78 is to a gas turbine speed governor set point generator 88. One output provided from set point generator 88 is a speed reference signal 90 representing a desired shaft speed selected to be between 95% to 107% of rated speed.

Outputs from the unit startup program 76 include a time scheduled output value 92 supplied to the steam turbine startup program, a startup fuel schedule signal 94 designed to provide certain limiting functions necessary to gas turbine starting, a steam turbine acceleration reference signal 96 and a gas turbine acceleration reference signal 98.

Several called-for values of gas turbine fuel flow are selected by a gas turbine acceleration control 100 and a gas turbine speed control 102, a gas turbine exhaust temperature control 104 and a number of other miscellaneous controls which are represented by the single block 106. The outputs from these controlling functional devices may call for widely varying values of gas turbine fuel flow. They are supplied to a minimum value gate 108, together with startup fuel schedule signal 94. A minimum value gate selects only the one of the applied input signals which will result in the lowest gas turbine fuel flow control signal, as described in the aforementioned U.S. Pat. No. 3,520,133 to Johnson and Loft. A minimum value gate may be an electronic analog device selecting the lowest analog input signal. Conversely, it may be a computer program subroutine which continuously examines digital values representing the digital outputs of the several control blocks 76, 100, 102, 104, 106 and selects the lowest digital number by an algorithm well-known in the art.

Since combustion in the gas turbine cannot be sustained if the fuel flow falls below a minimum value, a settable minimum fuel flow control 110 provides an output to a gas turbine maximum value gating device (or algorithm) 112 along with an input from the gas turbine minimum value gate 108. The output from the gas turbine maximum value gate 112 is the fuel command signal 64.

Turning to the steam turbine portion of the controls, a steam turbine acceleration control 114, a steam turbine speed control 116 and steam turbine control valve set point generator 82 all provide separate input signals signifying desired control valve positions to a steam turbine minimum value gate 118. The minimum value gate 118 selects only the one of the applied input signals which results in the least open steam control valve position. Similar to the gas turbine minimum fuel control, the steam turbine control further includes a steam turbine minimum flow control 120 which ensures a minimum steam flow through the control valves. The minimum steam flow serves to cool the steam turbine when running at rated speed under gas turbine fuel control, and during transfer from auxiliary steam to steam from the HRSG.

The signal from steam turbine minimum value gate 118 and minimum flow control 120 are applied to a steam turbine maximum value gate 122. The output 66 from the maximum value gate 122 sets the position of the steam control valves.

The details and inter-relationship of the gas turbine and steam turbine speed and acceleration control will now be explained. Since the gas turbine 2 and steam turbine 4 are on a single shaft, the term actual speed signal signifies a quantity representing the actual speed of either the gas turbine or the steam turbine. However, their set points or reference signals are separately and selectively variable.

One requested fuel signal from the gas turbine speed control 102 is obtained by summing a gas turbine speed reference signal 90 with an actual turbine speed signal 68 in a summing device 124 to obtain a speed error signal. Another requested fuel signal from the gas turbine acceleration control 100 is obtained by comparing a gas turbine acceleration reference signal 98 with a time derivative or rate of change of speed signal 68 so as to provide an acceleration error signal.

Similarly, one requested steam valve position signal from the steam turbine speed control 116 is obtained by summing actual turbine speed 68 with a steam turbine speed reference 86 in a summing device 126 to provide a speed error signal. Another requested steam value position is obtained in steam turbine acceleration control 114, by comparing an acceleration reference signal 96 with a time derivative or rate of change of turbine speed 68 so as to obtain an acceleration error signal. The foregoing obtaining of differentiated speed signals and comparisons in the minimum value gates for the respective controls can be accomplished through analog electronic devices as explained in the aforementioned U.S. Pat. Nos. 3,520,133 and 3,340,883, the subject matter of which are incorporated herein by reference. Alternatively, the summations and gating may take place through well known techniques by implementation in a digital computer program.

Figure 3A:
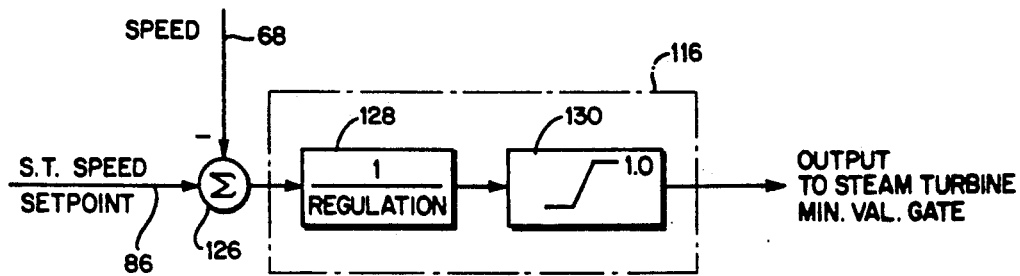

In order to illustrate the functional working of the speed control 116 for the steam turbine, FIG. 3a shows in functional block diagram and graph the output (steam turbine control valve position) with variation in speed. A selected steam turbine speed reference 86, here 105% of rated speed is compared with actual speed signal 68 in a summing device 126. The steam turbine speed control 116 (see FIG. 2) includes means to select the speed regulation (change in valve position with change in speed) represented by logic block 128 by multiplying the speed error (difference between speed reference and actual speed) by a gain factor which is the reciprocal of the speed regulation, as taught in Eggenberger U.S. Pat. No. 3,097,488. The speed control 116 further includes means to limit minimum and maximum excursions of the output signal, represented by function generator indicated in block 130.

Figure 3B:
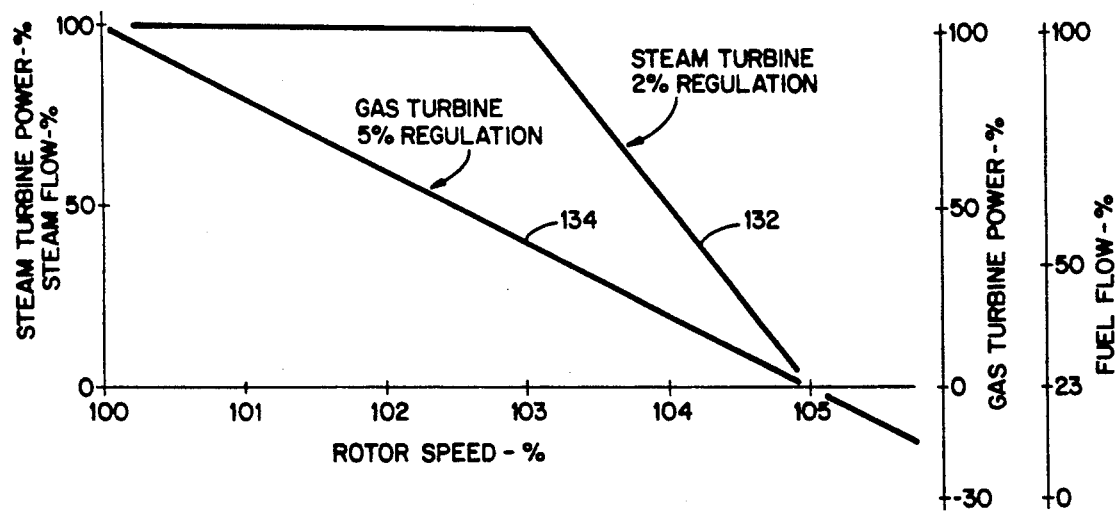

FIG. 3b is a composite graph showing the speed regulation characteristics of the steam turbine speed control 116 and the gas turbine speed control at particular settings. The abscissa shows the turbine rotor speed of both stem turbine and gas turbines expressed as a percent of rated speed. The left hand ordinate is scaled to show steam turbine power and steam flow both expressed as percent of full flow and power at rated speed. The right hand ordinate represents the gas turbine, where power is expressed as a percentage of full power and fuel flow is shown on a modified scale so as to correspond to the indicated gas turbine power, also expressed as a percentage. Since there is a minimum fuel flow required to sustain the gas turbine at no load and rated speed, the origins of the two right hand scales do not correspond.

Action of the steam turbine control is shown by line 132 in FIG. 3b. Variation in speed of the unit with a steam turbine set point of 105% and with a speed regulation of 2% results in a steam turbine valve moving from a full open position (100% steam flow) at 103% of rated speed to a full closed position (0% steam flow) at 105% of rated speed. Corresponding to this variation in steam flow, the steam turbine contribution varies from 100% power output to 0% power output.

On the same graph, lines 134 illustrates the variation of fuel flow and gas turbine power as a function of rotor speed at a speed set point at 105% of rated speed, but with a speed regulation of 5%. Fuel flow and gas turbine power are indicated on the right hand ordinates, where 0% gas turbine power corresponds to 23% of the fuel flow. Because of a wider or broader regulation of the gas turbine speed control, the gas turbine fuel flow varies from 100% flow at 100% of rated speed to minimum (23%) fuel flow at 105% of rated speed.

The two lines 132 and 134 illustrate control of overspeed by the combined action of the steam turbine speed control 116 and the gas turbine speed control 102. The gas turbine speed control alone will control speed between 100% and 103% of rated speed with the steam control valves remaining in full open position. Between 103% and 105% of rated speed, the steam valves will move from full open to full closed position, reducing steam flow and steam turbine power from 100% to 0%. Fuel flow continues to decrease at the same time to continue reduction of gas turbine power. Therefore, under moderate transient load conditions, the combined closing of steam valves and reduction of fuel flow will rapidly reduce power input between 103% and 105% of rated speed by removing any power contribution of the steam turbine.

Summarizing, from 100% to 103% of rated speed, the fuel flow is reduced, while from 103% to 105% of rated speed, the fuel flow is further reduced while the steam valves are being closed at the same time. These values are only illustrative and may vary with the type of combined cycle turbine and control system.

A power-load unbalance system, shown in block diagram in FIG. 4, is incorporated in the program of the unified control system 10 to anticipate and limit overspeed following a rapid reduction of electrical load. The system receives as input three signals; one is a generator current signal 140 from sensor 50 indicative of instantaneous generator electrical load, the second is a steam turbine reheat pressure signal 142 from pressure sensor 48 indicative of the instantaneous mechanical power produced by the steam turbine, and the third is an actual gas turbine power signal 144 obtained from the gas turbine fuel command signal 64 (see FIG. 2).

Actual fuel flow to the gas turbine is proportional to the product of the valve flow area and valve inlet pressure of the gas control valve 18, since the flow at the throat of the valve is sonic, and therefore independent of downstream pressure. Gas turbine control valve inlet pressure is maintained as an explicit function of gas turbine speed, which is very close to 100% if the generator is on the line, carrying load, and therefore susceptible to overspeed due to load rejection. Since the control valve inlet pressure is constant, and the valve area versus lift is linear, and since lift is directly proportional to fuel command signal 64, the actual fuel flow is directly proportional to the fuel command signal 64.

Gas turbine mechanical power is very close to a linear function of fuel flow for the normal range of ambient temperatures. This relationship is as follows:

Power = 1.3 (Fuel Flow − 23), where Power and Fuel Flow are in %, and where "23" represents the full speed/no load fuel flow.

For example, if fuel flow is 100% then gas turbine power = 1.3 (100 − 23) = approximately 100% actual power. If fuel flow is 70% then power = 1.3 (70 − 23) = 61% actual power. This calculation is performed by a suitable function generator or an algorithm represented by block 149 in FIG. 4 to obtain a signal 144 representing gas turbine instantaneous actual power.

Since the power output signal 140 and two power input measurements are all in different dimensional quantities, they are each normalized to respective dimensionless numbers representing a percentage of what they would be under rated conditions, e.g. the actual turbine stage pressure signal 142 is divided by rated turbine stage pressure, the actual fuel flow signal 144 (less the minimum fuel) is divided by the fuel flow signal for full load rated fuel flow (less the minimum fuel), etc. Secondly, in the case of the two mechanical power signals 142, 144 they are each multiplied by another scaling factor reflecting the relative power input contribution of the steam turbine and the gas turbine under rated conditions. For example, the steam turbine power input might carry a weight of ⅓ and the gas turbine power input a weight of ⅔. The scaling operations are indicated by block 146 for the electrical power signal 140; block 148 for the steam turbine stage pressure signal 142; block 150 for the gas turbine power signal 144.

As an example, block 146 for the generator load incorporates algorithms or circuits to perform the following computation:

$$\frac{\text{Actual Generator Load}}{\text{Rated Generator Load}} = \frac{\text{Actual Generator Current}}{\text{Rated Generator Current}}$$

solving for a dimensionless number representing instantaneous generator load relative to rated generator load as represented by actual current sensed in the generator lines relative to rated generator current.

Block 148 for the steam turbine input power incorporates algorithm or circuitry to perform the following computations:

$$\frac{\text{Actual Steam Turbine Power}}{\text{Rated Steam Turbine Power}} = \frac{\text{Actual Reheat Pressure}}{\text{Rated Reheat Pressure}}$$

and then scaling the dimensionless result by a constant $K_{ST}$ representing the fraction of mechanical power contributed by the steam turbine to the combined cycle turbine at rated loads of both gas turbine and steam turbine.

Block 149 for the gas turbine input power incorporates algorithm or circuitry to perform the following computation:

$$\frac{\text{Actual } GT \text{ Power}}{\text{Rated } GT \text{ Power}} = \frac{\text{Actual Fuel Flow} - \text{Zero Load Fuel Flow}}{\text{Rated Fuel Flow} - \text{Zero Load Fuel Flow}}$$

where Actual Fuel Flow is signal 64 and where Zero Load Flow is fuel flow required to keep the gas turbine operating at full speed with no generator output and cooling steam only to the steam turbines. The dimensionless number is scaled by a constant $K_{GT}$ in block 150 representing the fraction of mechanical power contributed by the gas turbine to the combined cycle at rated loads of both gas turbine and steam turbine.

The two scaled power inputs from blocks 148 and 150 are summed at 152 as:

$$\frac{\text{Total Power Actual}}{\text{Total Power Rated}} = K_{GT} \frac{\text{Actual } GT \text{ Power}}{\text{Rated } GT \text{ Power}} + K_{ST} \frac{\text{Actual } ST \text{ Power}}{\text{Rated } ST \text{ Power}}$$

The two power input signals and the load signal are algebraically summed in the summing device or comparator 152. The output from summing device 152 is a measure of the difference between power produced by the turbines and power output of the generator, and is supplied to a comparator device 154, in a lower logic branch, which provides an output in the event that the mismatch of power of the combined steam and gas turbine over power output of the generator is greater than a selected threshold quantity, here selected as 0.4 per unit or 40%. In the upper logic branch, a signal proportional to generator current is differentiated with respect to time as shown in logic block 156. The formula is given in terms of the complex LaPlace variable "s". In actual practice, this is implemented in a digital computer program by a suitable algorithm, although it could also be implemented in a discriminator network. The rate of load change is subjected to a comparison in logic device 158, which provides an output in the event that the time rate of change of power output is less than a selected negative rate, here selected as −0.35 or 35%. The outputs from the two comparator devices 154, 158 are supplied to a logical AND 160 which, in turn, provides an output signal to a latch 162. The latch output signals various control devices to take rapid action to reduce the power input. The function of latch 162 is maintained until unlatched by signal on 163 signifying that power-load unbalance is below the threshold value.

OPERATION

After the combined cycle turbine is at speed, it is synchronized. Synchronization consists of connecting the generator 6 to the electrical output grid, whereafter the speed of the turbines is fixed by the grid electrical frequency. After the unit has been synchronized, the steam turbine valve set point 84 is reduced to zero and the steam turbine speed reference 86 is raised to maximum (i.e., 105% of rated) after which the steam supply is transferred from auxiliary source 58 to the HRSG 8.

The steam flow command before transfer is still determined by the steam turbine minimum flow control 120 through the steam turbine maximum value gate 122 sufficient to maintain steam turbine cooling.

When steam from the HRSG is available at sufficient flow rate as determined by steam pressure measurements, a command will be given by the steam turbine startup program 80, which will then automatically raise the steam valve set point 84. The set point will be increased to fully open the steam valve at a rate determined by overriding constraints determined by steam turbine metal temperature, steam pressure and temperature. At the end of this procedure, the steam control valves 26 and 28 will be fully open and the steam valve 26 and steam turbine 4 will accept all the steam from the HRSG at the pressure required for the flow to pass through the steam turbine 4 where it is expanded to the condenser while delivering energy to the shaft 45.

Normal load control under steady state or slowly varying load changes is performed by the control system increasing or decreasing fuel flow. This takes place in accordance with the gas turbine control system shown in FIG. 2 and according to regulation characteristics 134 in FIG. 3c. However, should transient load conditions cause speed (load) to rise above 103% of rated speed in the example shown, the steam turbine valve 26 will also commence closing according to regulation characteristic 132 in FIG. 3b. Therefore, between 103% and 105%, both fuel flow and steam flow are reduced by the unified control system in accordance with the respective regulation characteristics indicated by curves 134 and 132 respectively shown in FIG. 3d.

Operation of the improved power load unbalance system is as follows. When the sum of the scaled input powers of the steam turbine and gas turbine exceed the generator electrical output load by a fixed amount, it is an indication of imminent rapid speed rise. When further, the rate of change of load is negative and less than a selected value, it is an indication that the unbalance is not due to load variation or oscillation. Coincidence of both such conditions in the power-load unbalance control system will initiate immediate fast closing of the turbine steam control valve 26, through a special fast closing input device on the valve actuator (not shown), and also set the steam control valve set point 84 and fuel control set points 94 to zero position. This will cause the steam flow command signal to be completely overridden by the fast closing device, and it will cause the fuel flow to the gas turbine to be rapidly reduced to minimum fuel flow. The power-load unbalance system will reset automatically through latch 162 and the gas and steam flow command signal will again take over control of the valve positions. The steam control valve set point 84 remains at zero, however, until the machine has been resynchronized and is ready to be loaded as described for startup of the unit.

While there has been described what is considered to be the preferred embodiment of the invention, other modifications will occur to those skilled in the art, and it is desired to include in the appended claims all such modifications which fall within the true spirit and scope of the invention.

We claim:

1. Method for anticipating and limiting overspeed of a combined cycle turbine of the type having a gas turbine supplied with fuel by a fuel flow control valve and a steam turbine with a steam control valve both disposed on a single shaft, and having a heat recovery steam generator heated by said gas turbine and connected to supply steam to said steam control valve, said combined cycle turbine having a unified control system and driving an electrical generator, comprising the steps of;

providing a first power input signal representative of instantaneous power supplied by the steam turbine relative to full rated power output of the steam turbine, providing a second power input signal representative of instantaneous power supplied by the gas turbine relative to full rated power output of the gas turbine, providing a load responsive signal representative of actual load on said generator relative to full rated load of said generator, applying proportional scaling factors to said first and second power input signals to provide first and second scaled signals, summing said first and second scaled signals with said load responsive signal, and reducing the opening of the steam control valve and reducing the fuel flow through the fuel flow control valve when the sum of said first and second scaled signals exceeds said load responsive signal by a preselected amount.

2. The method according to claim 1, wherein said first power input signal is responsive to steam pressure, wherein said second power input signal is responsive to gas turbine fuel flow and wherein said third signal is proportional to generator current.

3. The method according to claim 1, wherein said first power input signal is proportional to reheat steam pressure.

4. The method according to claim 1, wherein said second power input signal is proportional to gas turbine fuel flow reduced by a constant minimum fuel flow.

5. The method according to claim 1, including controlling said combined cycle turbine below a preselected overspeed by varying fuel flow with said fuel flow control valve, and controlling said combined cycle turbine above said preselected overspeed under transient load conditions by varying fuel flow with said fuel flow control valve and simultaneously varying steam flow with said steam control valve.

6. System for anticipating and limiting overspeed of a combined cycle turbine of the type having a gas turbine supplied with fuel by a fuel flow control valve and a steam turbine with a steam control valve both disposed on a single shaft, and having a heat recovery steam generator heated by said gas turbine and connected to supply steam to said steam control valve, said combined cycle turbine having a unified control system and driving an electrical generator, comprising;

means for providing a first power input signal representative of instantaneous power supplied by the steam turbine relative to full rated power output of the steam turbine, means for providing a second power input signal representative of instantaneous power supplied by the gas turbine relative to full rated power output of the gas turbine, means for providing a load responsive signal representative of actual generator electrical power output relative to full rated load of said generator, means for applying proportional scaling factors to said first and second power input signals to provide first and second scaled signals, means for summing said first and second scaled signals with said load output signal, and means for reducing the opening of the steam control valve and reducing the fuel flow through the fuel flow control valve when the sum of said first and second scaled signals exceeds said load responsive signal by a preselected amount.

7. The system according to claim 6, wherein said first power input signal is responsive to steam pressure, wherein said second power input signal is responsive to gas turbine fuel flow and wherein said third signal is proportional to generator current.

8. The system according to claim 6, wherein said first power input signal is proportional to reheat steam pressure.

9. The system according to claim 6, wherein said second power input signal is proportional to gas turbine fuel flow reduced by a constant minimum fuel flow.

10. The system according to claim 6, including means for controlling said combined cycle turbine below a preselected overspeed by varying fuel flow with said fuel flow control valve, and means for controlling said combined cycle turbine above said preselected overspeed under transient load conditions by varying fuel flow with said fuel flow control valve and simultaneously varying steam flow with said steam control valve.

* * * * *